United States Patent [19]

Bucaro et al.

[11] 4,363,114
[45] Dec. 7, 1982

[54] LOW NOISE REMOTE OPTICAL FIBER SOUND DETECTOR

[75] Inventors: Joseph A. Bucaro, Herndon; James H. Cole, Great Falls, both of Va.; Henry D. Dardy, Upper Marlboro, Md.

[73] Assignee: The United States of America as represented by the Secretary of the Navy, Washington, D.C.

[21] Appl. No.: 226,986

[22] Filed: Jan. 21, 1981

[51] Int. Cl.³ .................. G02B 5/14; H04R 29/00
[52] U.S. Cl. .................................. 367/149; 73/655; 73/657
[58] Field of Search ............. 455/605, 612; 367/149, 367/3, 141, 172, 76, 178; 73/655, 657

[56] References Cited

U.S. PATENT DOCUMENTS

| | | | |
|---|---|---|---|
| 4,115,753 | 9/1978 | Shajenko | 367/149 |
| 4,162,397 | 7/1979 | Bucaro et al. | 455/605 |
| 4,193,130 | 3/1980 | Young et al. | 367/149 |
| 4,238,856 | 12/1980 | Bucaro et al. | 455/605 |
| 4,265,122 | 5/1981 | Cook et al. | 73/627 |
| 4,297,887 | 11/1981 | Bucaro | 73/655 |
| 4,313,185 | 1/1982 | Chovan | 73/657 |
| 4,320,475 | 3/1982 | Leclerk et al. | 367/149 |

OTHER PUBLICATIONS

Papp et al., "Vibration Induced Polarization . . . Fibres", 1/2/79, pp. 1-3.
Bucaro et al., "Acoustic-Optic Sensor Development", 10/11/79, pp. 572-580, Easco '79, IEEE EPA Syst.
Bucaro et al., "Measurement of . . . Acoustic Detection", 3/15/79, Appl. Optics, vol. 18, #6.

*Primary Examiner*—Nelson Moskowitz
*Attorney, Agent, or Firm*—Robert F. Beers; William T. Ellis; Alan P. Klein

[57] ABSTRACT

An optical system for frequency-modulation heterodyne detection of an acoustic pressure wave signal. An optical beam is directed into a Bragg cell outside of the fluid medium in which acoustic signals are to be detected. The Bragg cell modulates the incident beam such that two beams of different frequency exit the cell. The two beams are directed into an input optical fiber and the resultant combined beam is transmitted over a desired distance to a fiber optic transducer disposed in the fluid medium. The transducer includes two coiled optical fibers, a reference fiber and a signal fiber, each of which has a different sensitivity to incident acoustic pressure wave signals. The transmitted beam is directed from the input optical fiber through a power divider which splits the beam into two equal parts, one part passing through the reference fiber, the other part passing through the signal fiber. A filter in the signal fiber transmits only a fraction of the light at one of the two frequencies. The two parts of the split beam exiting the coiled optical fibers are coupled into another optical fiber and transmitted to a photodetector from which the output signal is processed to indicate the detection of an acoustic pressure wave signal. In a modification of the system, different polarization states are imparted with a polarizer and a half-wave retardation plate to the two beams of different frequency produced by the Bragg cell. The power divider and filter are replaced by a polarization beam splitter and another half-wave plate.

22 Claims, 2 Drawing Figures

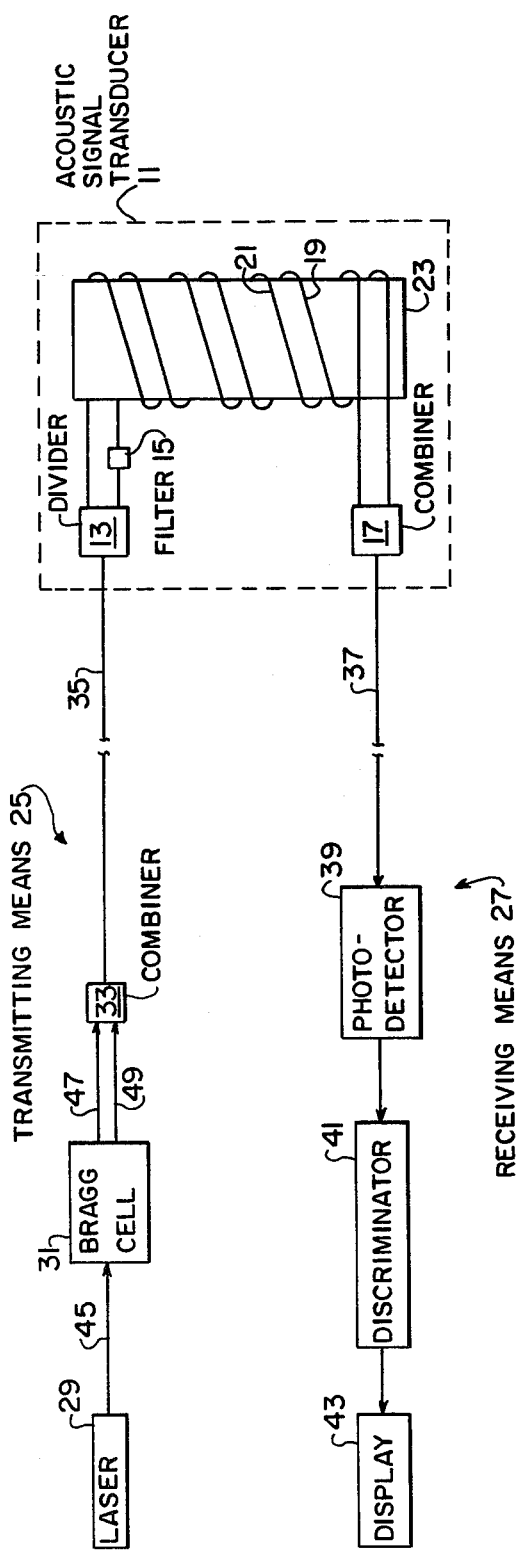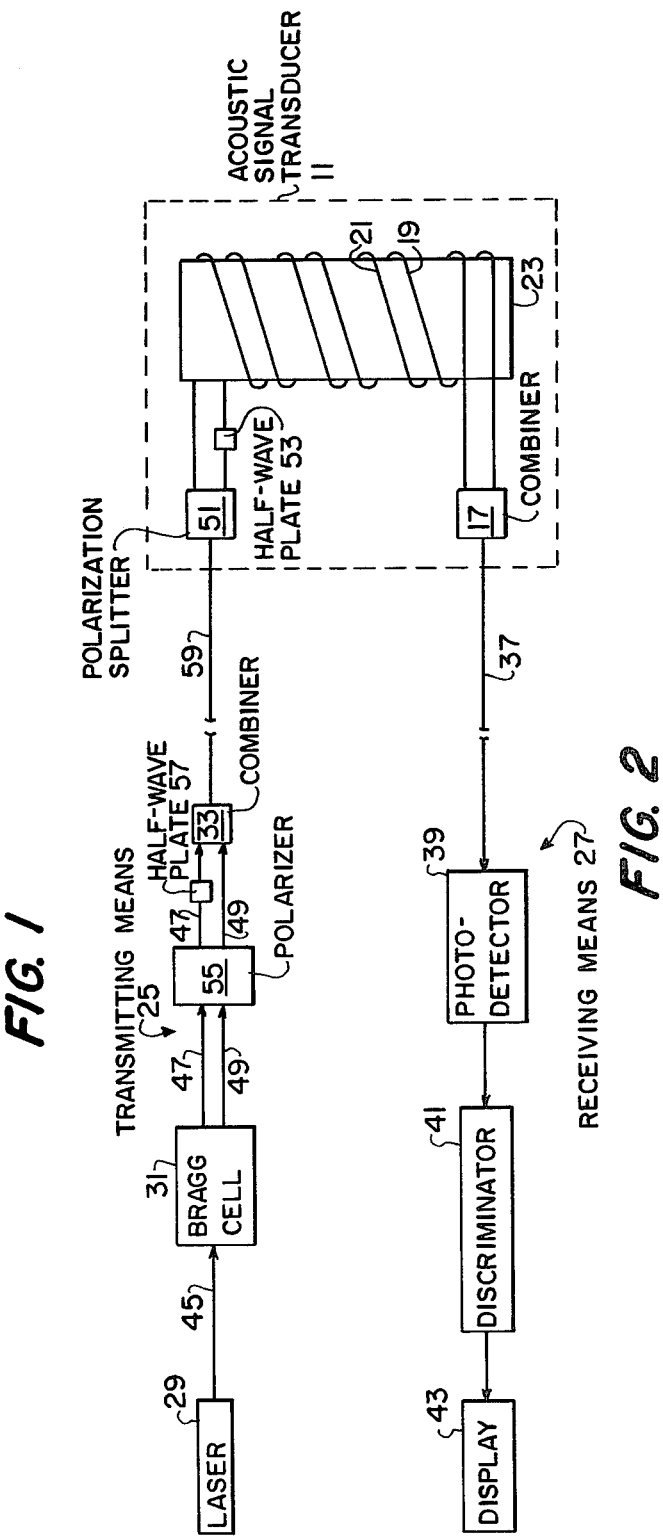

LOW NOISE REMOTE OPTICAL FIBER SOUND DETECTOR

BACKGROUND OF THE INVENTION

The present invention relates generally to sound detectors and more particularly to optical systems which detect acoustic signals.

A new class of sound detectors which detect acoustically-induced phase-shifts in light beams traveling through optical fibers has been described in U.S. Pat. No. 4,162,397 to J. A. Bucaro et al., issued July 24, 1979 and in U.S. Pat. No. 4,297,887 issued Nov. 3, 1981 to J. A. Bucaro, both assigned to the same assignee as the present case. In the sound detector disclosed in U.S. Pat. No. 4,162,397, a laser beam is split, one part of the beam being sent into a sensing optical fiber and another part of the beam being sent into a reference optical fiber. The sensing optical fiber is placed in a fluid medium in which an acoustic pressure wave signal is to be detected, while the reference fiber is kept at a remote location where it can be isolated from the acoustic pressure wave signal. The acoustic pressure signal alters the optical path length of the sensing fiber through strain-induced index of refraction changes and pressure-induced fiber length changes. Added sensitivity can be provided by application of a suitable elastomeric or plastic coating to the fiber. The coating elongates when subjected to pressure, thereby stretching the inner glass fiber. The optical-path-length changes induced in the sensing fiber by the acoustic pressure wave signal cause the phase of the beam passing through the sensing fiber to be modulated by the waveform of the acoustic pressure wave signal. In homodyne operation of the detection system, the two parts of the split laser beam are recombined and mixed on the surface of a photodetector to produce an electrical signal having a zero frequency component that carries the phase modulation as an equivalent frequency modulation. The zero-frequency electrical signal component is demodulated and the waveform of the acoustic pressure wave signal is recovered.

In order to eliminate low frequency 1/f noise from the photodetector, the detection system is preferably operated in a heterodyne mode, rather than the homodyne mode described above. In the heterodyne mode of operation, an optical modulator such as a Bragg cell is introduced in the reference fiber to shift the frequency of the part of the split laser beam passing through the reference fiber. When the two parts of the split laser beam are recombined and mixed on the surface of the photodetector the component of the electrical signal carrying the phase modulation has a non-zero frequency which is equal to the difference of the frequencies of the two parts of the split laser beam passing through the fibers. As before, the difference frequency component is demodulated and the waveform of the acoustic pressure wave signal is recovered. However, since the modulated component of the electric signal is now a high frequency component, low frequency 1/f noise is eliminated.

The disclosed sound detector suffers from several disadvantages. Firstly, the reference fiber must be physically separated from the sensing fiber, since if the acoustic pressure wave alters the optical path length of both fibers, there is no net effect. Secondly, since the two fibers are physically separated, they will experience different temperature fluctuations. As little as millidegree temperature fluctuations in the two fibers results in extremely large noise signals generated in the photodetector current. Thirdly, sound waves acting along the fiber leading to the pair of reference and sensing fibers are also detected. This leads to problems when level sound detection is desired or in remote sensing with very long lead fibers. Finally, the coherence length of the laser must be at least as long as the total optical path length difference between a beam traveling through the sensing fiber and one traveling through the reference fiber. If low tolerence sources are utilized, the path lengths of the fibers must be carefully matched.

The sound detector disclosed in U.S. Pat. No. 4,297,887 seeks to eliminate these problems. Essentially, this sound detector involves using a reference fiber whose acoustic sensitivity is different from that of the sensing fiber and coiling the fibers together as a pair. In this approach, both the reference fiber and the associated optical modulator are placed, along with the sensing fiber, in the fluid medium rather than being kept at the remote location. This requires that electrical power and signals for the optical modulator be sent all the way to the point where the acoustic pressure wave signals are to be detected. However, the full potential of the sound detector is realized when only optical signals need be conveyed to and from the fluid medium in which the acoustic pressure wave signals are to be detected.

SUMMARY OF THE INVENTION

Accordingly, it is an object of the present invention to improve optical systems which detect acoustic signals.

Another object is to detect acoustic signals with such systems without having to send electrical power all the way to the point where the acoustic signals are to be detected.

A further object is to desensitize such systems to temperature and mechanical perturbations and to make them noise-free.

The objects of the present invention are achieved by an optical system for frequency-modulation heterodyne detection of an acoustic pressure wave signal. The optical system includes a transducer having a power-dividing means which divides a light beam of two frequencies into a pair of equal power reference and signal beams having different ratios of the two frequencies. Additionally, the transducer includes means which modulates at least the signal beam by the acoustic signal, and a power-combining means which combines the modulated pair of beams into a resultant beam carrying the modulating acoustic signal. A transmitter transmits the input light beam composed of two frequencies from a remote location to the transducer, and a receiver receives the modulated resultant combined beam from the transducer.

Rather than introducing an optical modulator into the reference fiber as in the prior art to produce the second frequency required for heterodyne detection, a modulator is included in the transmitter to provide two frequencies in the laser beam which is split at the transducer. Provided that the beam is split so that the reference and signal beams have different ratios of the two frequencies, the system can be operated in the heterodyne mode to recover the acoustic pressure signal waveform. Since the modulator is in the transmitter, no electrical power or signals need be sent to the transducer. Furthermore, since the phase shifts induced by temperature and mechanical perturbations in the transmitter and receiver are the same for the two frequencies, the system is insensitive to such perturbations. Use of the heterodyne mode and frequency modulation eliminates noise problems inherent in homodyne or amplitude modulation optical detection systems.

Additional advantages and features will become apparent as the subject invention becomes better understood by reference to the following detailed description when taken in conjunction with the accompanying drawings wherein:

BRIEF DESCRIPTION OF THE DRAWINGS

FIG. 1 is a block schematic diagram of a first embodiment of the optical system for frequency-modulation heterodyne detection of an acoustic pressure wave signal according to the invention.

FIG. 2 is a block schematic diagram of a second embodiment of the optical system for frequency-modulation heterodyne detection of an acoustic pressure wave signal according to the invention.

DESCRIPTION OF THE PREFERRED EMBODIMENTS

Referring now to the drawings wherein like reference characters refer to like or corresponding parts, FIG. 1 illustrates an optical system for frequency-modulation heterodyne detection of an acoustic pressure wave signal.

The optical system includes an acoustic signal transducer 11 disposed in the vicinity of the source (not shown) of the acoustic pressure wave signal to be detected. In preference to any other form of transducer, the invention uses a transducer in the nature of a power-dividing means which divides a light beam of two frequencies into a pair of equal-power reference and signal beams having different ratios of the two frequencies; a modulating means which modulates at least the signal beam by the acoustic signal; and a power-combining means which combines the modulated pair of beams into a resultant beam carrying the modulating acoustic signal. As shown in FIG. 1, the power-dividing means may comprise, for example, a 3 dB power divider 13 in combination with an optical filter 15. Optical power dividers and filters are well known to those skilled in the art, suitable power dividers and filters being respectively disclosed, for example, in the articles "Single-Mode Fiber-Optical Power Divider: Encapsulated Etching Technique" by S. K. Sheem and T. G. Giallorenzi in *Optics Letters*, Vol. 4, p. 29 (1979), and "Narrowband Bragg Reflectors in Optical Fibers" by B. S. Kawasaki et al. in *Optics Letters*, Vol. 3, p. 66 (1978). The optical filter 15 is connected to an output port of the power divider 13 from which the divider outputs the signal beam. The filter 15 attenuates one of the two frequencies in the signal beam. The power-combining means may comprise, for example, a power combiner 17 formed from a power divider such as disclosed in the *Optics Letters* article, referenced above. The modulating means may comprise, for example, a pair of wave guides 19 and 21 having an acoustic signal-dependent optical path difference. Optical fibers having different coatings, different glass compositions, or different lengths, but otherwise having identical optical properties, may be utilized for the wave guides since they will experience unequal optical path changes proportional to applied acoustic pressure when subjected to the same amount of acoustic pressure. For example, the application of a coating such as plastic to a bare optical fiber can increase its acoustic sensitivity ten-fold compared to an optical fiber without such a coating. The optical fibers 19 and 21 are shown wound in parallel relationship on a supporting structure 23 to increase their effective cross-section to acoustic signals. One fiber 19 is connected between the filter 15 and one input port of the power combiner 17 for guiding the signal beam. The other fiber 21 is connected between the other output port of the power divider 13 and the other input port of the power combiner 17 for guiding the reference beam.

The remaining components of the detection system are a transmitting means 25 which transmits the input light beam composed of two frequencies from a remote location to the transducer 11, and a receiving means 27 which receives the modulated resultant combined beam from the transducer and converts it into the modulating signal at the remote location. While a variety of transmitting means 25 may be provided, such means may conveniently take the form illustrated in FIG. 1 of a monochromatic light source, such as laser 29, having a coherence-length greater than the optical path difference of fibers 19 and 21; a light modulator, such as a Bragg cell 31 disposed behind the laser; a power combiner 33 disposed behind the Bragg cell; and a wave guide, such as an optical fiber 35, coupled to the output port of the power combiner. Bragg cells are acoustooptical modulators in which an acoustic or ultrasonic electric input signal modulates a beam of light. Bragg cells are disclosed, for example, in the text *Physical Acoustics*, ed. by W. P. Mason and R. N. Thurston, Vol. 7, at pp. 316–323. While a variety of receiving means 27 may be provided, such means may conveniently take the form illustrated in FIG. 1 of a wave guide, such as an optical fiber 37 connected to the output of the transducer 11; a mixer, such as photodetector 39 disposed at the output of the optical fiber; a demodulator, such as a frequency discriminator 41 coupled to the photodetector; and a display 43 coupled to the discriminator.

In operation, the monochromatic output 45 of the laser 29 is diffracted in the Bragg cell 31 into at least two separated monochromatic beams 47 and 49 of differing frequency. The two beams 47 and 49 are received by the respective input ports of the power combiner 33 and are coupled to its output port for transmission by the optical fiber 35 from the remote location to the 3 dB power divider 13 in the transducer 11. The divider 13 divides the transmitted beam into two equal-power reference and signal beams having equal proportions of the two frequencies, outputting the reference beam to one optical fiber 21 and the signal beam to the other optical fiber 19 via the filter 15. The filter attenuates one of the two frequencies in the signal beam to cause the reference and signal beams to have different ratios of the two frequencies. This is a necessary condition for frequency-modulation heterodyne detection of the acoustic pressure wave signal by the optical system, and it may be shown that detection is optimum when the filter completely blocks the one frequency. An acoustic pressure wave signal impinging on the transducer 11 modulates the optical path difference of the optical fibers 19 and 21 by varying the optical path length of one or both fibers depending on their respective acoustic sensitivities, and thereby causes the phase difference of the two beams to be modulated by the acoustic signal waveform. The two modulated beams are received by the respective input ports of the power combiner 17 and coupled to its output port for transmission by the optical fiber 37 from the transducer 11 to the photodetector 39 at the remote location. The combined reference and signal beams are mixed on the surface of the photodetector to produce an electrical signal having a frequency component at the difference of the two frequencies and carrying the phase-difference modulation as an equivalent frequency modulation. This latter frequency component is demodulated by the frequency discriminator 41 and the waveform of the modulating acoustic pressure signal is displayed on the display 43.

FIG. 2 illustrates a modification of the system shown in FIG. 1. The system of FIG. 2 differs from that of FIG. 1 in the details of the power-splitting means of the transducer 11. Specifically, a polarization beam splitter 51, for example, an Oriel Corporation, Stanford, Conn., Model 2604 beamsplitter cube, is substituted for the 3 dB power divider 13, and a half-wave retardation plate 53 with its optic axis oriented at 45° to the transmission direction of the beam splitter is substituted for the optical filter 15. In addition, the transmitting means 25 is modified by the inclusion of a means for imparting different polarization states to the two frequencies in the transmitted light beam, and by the substitution of a polarization-preserving optical fiber 59 for optical fiber 35. While a variety of polarization state-imparting means may be provided, such means may conveniently take the form shown in FIG. 2 of a polarizer 55 disposed in front of one of the input ports of the power combiner 33 with its optic axis oriented at an angle of 45° to the transmission direction of the polarizer. The polarization-preserving fiber 59 is so oriented that the optical output of the beam combiner 33 is aligned with the principal axes of the fiber. Polarization-preserving optical fibers are well known to those skilled in the art, suitable fibers being disclosed, for example, in the article "Single-Polarization Optical Fibers: Exposed Cladding Technique" by V. Ranaswamy, I. P. Kaminow and P. Kaiser in *Applied Physics Letters*, Vol. 33, p. 814 (1978). The operation of the modified system of FIG. 2 is similar to that of FIG. 1 except that after diffraction of the monochromatic output 45 of the laser 29 into two separated monochromatic beams 47 and 49 of differing frequency by the Bragg cell 31, the two beams are linearly polarized by the polarizer 55 and the azimuth of one of the two beams of linear light 47 is rotated through 90° by the half-wave retardation plate 57. The two beams, each now differing in polarization state as well as in frequency, are then combined in the power combiner 33 and transmitted by the polarization-preserving optical fiber 59 to the polarization beam splitter 51. The polarization beam splitter 51 splits the transmitted beam into two equal-power reference and signal beams having unequal ratios of the two polarization states and, therefore, of the two frequencies. The condition of unequal ratios is again necessary for frequency-modulation heterodyne detection of the acoustic pressure wave signal by the optical system, and it may be shown that detection is optimum when the transmitted beam is split so that the reference beam consists entirely of one of the two polarization states and the signal beam consists entirely of the other polarization state. The polarization beam splitter 51 outputs the reference beam to one optical fiber 21 and the signal beam to the other optical fiber 19 via the half-wave retardation plate 53. The retardation plate 53 counter-rotates the azimuths of the waves of the two frequencies in the signal beam through 90° to match the polarization state in the signal beam of either one of the two frequencies to the polarization state in the reference beam of the other two frequencies. The operation of the remainder of the system is the same as that of FIG. 1.

Obviously, numerous modifications and variations on the present invention are possible in light of the above teachings. For example, the half-wave retardation plate 53 could be placed in either one of the optical fibers 19 or 21 and at any position along the fiber. Also, the polarizer 55 could be placed directly behind the laser 29 in the path of beam 45. It is therefore to be understood that within the scope of the appended claims, the invention may be practiced otherwise than as specifically described herein.

We claim:

1. An acoustic signal transducer comprising:
   power-dividing means for dividing a light beam of two frequencies into a pair of equal-power reference and signal beams having different ratios of the two frequencies;
   modulating means for modulating at least the signal beam by an acoustic signal; and
   power-combining means for combining the modulated pair of beams into a resultant beam carrying the modulating acoustic signal.

2. The transducer recited in claim 1 wherein the power-dividing means includes:
   a 3 dB power divider having an input port for receiving the light beam of two frequencies and a pair of output ports for respectively outputting the reference and signal beams.

3. The transducer recited in claim 2 wherein the power-dividing means includes:
   an optical filter connected to an output port of the power-divider.

4. The transducer recited in claim 1 wherein the modulating means includes:
   a pair of wave guides having an acoustic signal-dependent optical path difference.

5. The transducer recited in claim 4 wherein the wave guides include:
   optical fibers having different coatings.

6. The transducer recited in claim 4 wherein the wave guides include:
   optical fibers having different glass compositions.

7. The transducer recited in claim 4 wherein the wave guides include:
   optical fibers having different lengths.

8. The transducer recited in claim 1 wherein the power-dividing means includes:
   a polarization beam splitter having an input port for receiving the light beam of two frequencies and a pair of output ports for respectively outputting the reference and signal beams.

9. The transducer recited in claim 8 wherein the power-dividing means includes:
   a half-wave retardation plate disposed behind one of the output ports of the polarization beam splitter.

10. In combination with the transducer recited in claim 1:
    transmitting means for transmitting the light beam of two frequencies to the power-dividing means; and
    receiving means for receiving the modulated resultant combined beam from the transducer and converting the received beam into the modulating signal.

11. The combination recited in claim 10 wherein the transmitting means includes:

a monochromatic light source;
a light modulator disposed behind the light source;
a power combiner disposed behind the light modulator; and
a wave guide coupled to the output port of the power combiner.

12. The combination recited in claim 10 wherein the transmitting means includes:
a laser;
a Bragg cell disposed behind the laser;
a power combiner disposed behind the Bragg cell; and
an optical fiber coupled to the output port of the power combiner.

13. The combination recited in claim 10 wherein the receiving means includes:
a wave guide connected to the output of the transducer;
a mixer disposed at the output of the wave guide;
a demodulator coupled to the mixer; and
a display coupled to the demodulator.

14. The combination recited in claim 10 wherein the receiving means includes:
an optical fiber connected to the output of the transducer;
a photodetector disposed at the output of the optical fiber;
a frequency discriminator coupled to the photodetector; and
a display coupled to the frequency discriminator.

15. The combination recited in claim 10 wherein the transmitting means includes:
means for imparting different polarization states to the two frequencies in the transmitted light beam.

16. The combination recited in claim 11 wherein the transmitting means includes:
a polarizer disposed behind the light modulator; and
a half-wave retardation plate disposed in front of one of the input ports of the power combiner.

17. The combination recited in claim 16 wherein the wave guide includes:
a polarization-preserving optical fiber.

18. In an optical system for frequency-modulation heterodyne detection of an acoustic pressure wave signal, a transmitter comprising:
a monochromatic light source;
a light modulator disposed behind the light source for diffracting the output of the light source into two separated monochromatic beams of differing frequency;
means for imparting different polarization states to the two frequencies;
a power combiner disposed behind the light modulator; and
a wave guide coupled to the output port of the power combiner.

19. The transmitter recited in claim 18 wherein the polarization state-imparting means includes:
a polarizer disposed behind the light source; and
a half-wave retardation plate disposed in front of one of the input ports of the light modulator.

20. The transmitter recited in claim 18 wherein the wave guide includes:
a polarization-preserving optical fiber.

21. An acoustic signal transducing process comprising:
dividing a light beam of two frequencies into a pair of equal-power reference and signal beams having different ratios of the two frequencies;
modulating at least the signal beam by an acoustic signal; and
combining the modulated pair of beams into a resultant beam carrying the modulating acoustic signal.

22. In combination with the transducing process recited in claim 1, the steps of:
transmitting the light beam of two frequencies prior to the dividing step;
after the combining step, receiving the modulated resultant combined beam; and
converting the received beam into the modulating signal.

* * * * *